(12) United States Patent
Huckaba et al.

(10) Patent No.: US 6,657,551 B2
(45) Date of Patent: Dec. 2, 2003

(54) DOWNHOLE TELEMETRY SYSTEM HAVING DISCRETE MULTI-TONE MODULATION AND DYNAMIC BANDWIDTH ALLOCATION

(75) Inventors: Bruce S. Huckaba, Houston, TX (US); Geoff Nightingale, Houston, TX (US); Carl Dodge, Houston, TX (US); Wallace R. Gardner, Houston, TX (US); Myrick Monroe, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 286 days.

(21) Appl. No.: 09/775,093

(22) Filed: Feb. 1, 2001

(65) Prior Publication Data

US 2002/0101359 A1 Aug. 1, 2002

(51) Int. Cl.$^7$ ................................................. G01V 3/00
(52) U.S. Cl. ............................... 340/855.4; 340/853.2; 370/468; 375/222; 375/354
(58) Field of Search ................................. 375/261, 225, 375/222, 354; 340/853.8, 854.7, 854.9, 855.4, 853.2; 367/68; 370/506, 468

(56) References Cited

U.S. PATENT DOCUMENTS

| | | | |
|---|---|---|---|
| 2,810,546 A | 10/1957 | Eaton et al. ................ 255/1 |
| 3,991,611 A | 11/1976 | Marshall, III et al. ........ 73/151 |
| 4,355,310 A | 10/1982 | Belaigues et al. .......... 340/858 |
| 4,926,415 A | 5/1990 | Tawara et al. ................ 370/60 |
| 5,191,326 A | 3/1993 | Montgomery ............ 340/855.5 |
| 5,243,337 A | 9/1993 | Beauducel et al. ....... 340/855.3 |
| 5,365,229 A | 11/1994 | Gardner et al. .......... 340/855.4 |
| 5,473,321 A | 12/1995 | Goodman et al. ........ 340/854.9 |
| 5,479,447 A | * 12/1995 | Chow et al. ................ 375/260 |
| 5,594,344 A | 1/1997 | Doyle et al. ................ 324/338 |
| 5,600,663 A | 2/1997 | Ayanoglu et al. ............. 371/41 |
| 5,625,651 A | * 4/1997 | Cioffi ........................ 375/354 |
| 5,774,420 A | 6/1998 | Heysse et al. ................ 367/83 |

(List continued on next page.)

FOREIGN PATENT DOCUMENTS

| | | |
|---|---|---|
| EP | 0352869 | 1/1990 |
| EP | 0955744 | 11/1999 |
| WO | 9933215 | 7/1999 |
| WO | 0149001 | 7/2001 |

Primary Examiner—Michael Horabik
Assistant Examiner—Albert K. Wong
(74) Attorney, Agent, or Firm—Conley Rose, P.C.

(57) ABSTRACT

A downhole telemetry system having discrete multi-tone modulation and dynamic bandwidth allocation is disclosed herein. In one embodiment, the downhole telemetry system comprises a surface transceiver, a cable, and a downhole transceiver coupled to the surface transceiver via the cable. The downhole transceiver communicates to the surface transceiver using discrete multi-tone (DMT) modulation to transmit telemetry information over a set of frequency subchannels allocated for uplink communications. The surface transceiver may likewise communicate to the downhole transceiver using DMT modulation to transmit information over a set of frequency subchannels allocated for downlink communications. The number of uplink and downlink communications subchannels is preferably variable and preferably can be changed depending on the operating mode of the system. This allows additional subchannels to be allocated for downlink communications during programming and configuration of the downhole equipment, and additional subchannels to be allocated for uplink communications during normal logging operations. The set of uplink communications subchannels may be disjoint from the set of downlink communications subchannels, and the sets may be spaced apart in frequency or interleaved in frequency. The cable may be a single conductor or multi-conductor logging cable. In the case of the multi-conductor logging cable, one of several possible orthogonal transmission modes may be used to convey the information signals.

17 Claims, 4 Drawing Sheets

U.S. PATENT DOCUMENTS

| | | | |
|---|---|---|---|
| 5,838,727 A | 11/1998 | Lyon et al. | 375/261 |
| 5,931,961 A | 8/1999 | Ranganathan et al. | 714/712 |
| 6,229,453 B1 * | 5/2001 | Gardner et al. | 340/853.8 |
| 6,259,746 B1 * | 7/2001 | Levin et al. | 375/295 |
| 6,430,148 B1 * | 8/2002 | Ring | 370/208 |
| 6,469,636 B1 * | 10/2002 | Baird et al. | 340/854.9 |
| 6,473,438 B1 * | 10/2002 | Cioffi et al. | 370/468 |
| 6,498,808 B1 * | 12/2002 | Tzannes | 375/225 |

* cited by examiner

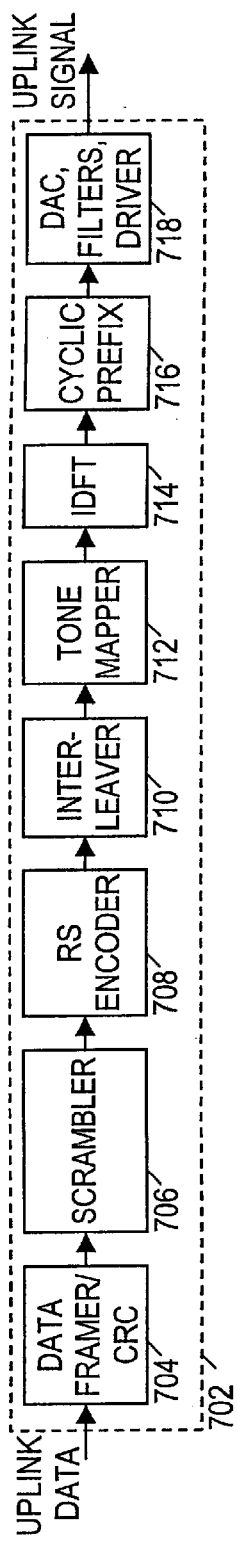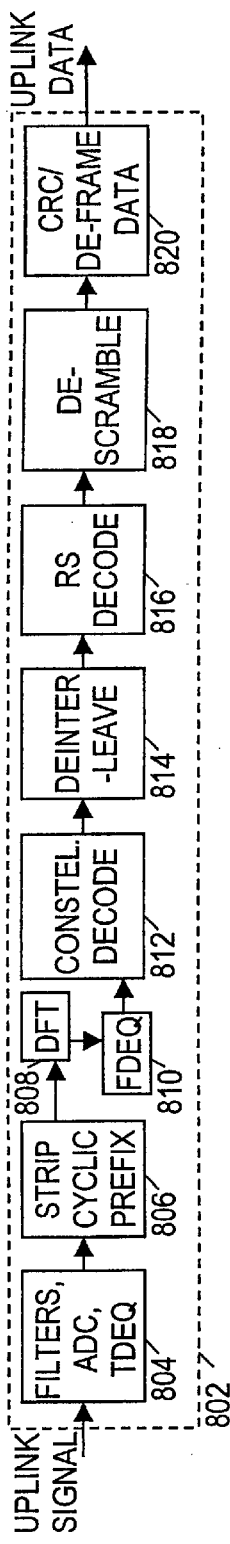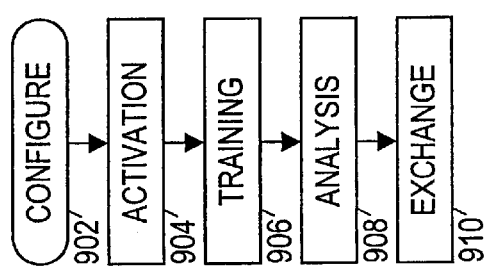

DOWNHOLE TELEMETRY SYSTEM HAVING DISCRETE MULTI-TONE MODULATION AND DYNAMIC BANDWIDTH ALLOCATION

BACKGROUND

1. Field of the Invention

The present invention relates generally to high speed digital data communications for use in downhole telemetry. More specifically, the invention relates to a high-speed communications scheme for transferring data between downhole sensors and surface computers. More specifically still, the invention relates to a downhole telemetry system having discrete multi-tone modulation and dynamic bandwidth allocation between uplink and downlink data streams.

2. Description of Related Art

Modem petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

An alternative method of logging is the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Sensors or transducers typically are located at the lower end of the drill string in LWD systems. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline. Of these, the mud pulse system is one of the most widely used telemetry systems for MWD applications.

The mud pulse system of telemetry creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is on the order of a pulse per second (1 Hz).

Yet another method of gathering downhole data is seismic imaging. Classic seismic imaging involves stringing hundreds of listening devices, or geophones, over the surface of the Earth near a location where a characteristic picture of the underground formations is desired. Geophones measure both compressional and shear waves directly and they include particle velocity detectors. Geophones typically provide three-component velocity measurement. Geophones can be used to determine the direction of arrival of incident elastic waves. Once these geophones are strategically placed on the surface of the Earth, a seismic disturbance is created which creates traveling waves through the Earth's crust. As these traveling waves encounter boundaries of strata having varying densities, portions of the traveling wave reflect back to the surface. These varying density stratas may include changes in strata components as well as varying densities encountered at boundaries of hydrocarbon reservoirs. By measuring the propagation time, amplitude and direction of reflected waves as they reach the surface, a three-dimensional representation of the formations lying below the surface of the Earth can be constructed.

After a particular hydrocarbon formation is found, the need for information is not alleviated. Once a hydrocarbon reservoir is tapped, the goal becomes removing as much of the hydrocarbons from the reservoir as possible. Here again, the more information one has about the locations of hydrocarbons within the reservoir over the course of time, the more likely the hydrocarbons contained in the reservoir can be fully extracted at the lowest possible cost. Having multiple three-dimensional seismic representations of conditions below the surface over time is typically referred to as four-dimensional (4D) seismic imaging. In early implementations, four-dimensional seismic was created by performing multiple three-dimensional seismic images of the strata or hydrocarbon reservoir in question. However, obtaining four-dimensional seismic representations of underground hydrocarbon reservoirs in this manner has its problems. For instance, the time period for taking readings to determine migration patterns of the hydrocarbons may be as long as years. That is, a single three-dimensional seismic reading may be taken once a year over the course of several years to obtain the four-dimensional seismic image. Each time this three-dimensional seismic image is taken, miles of cables containing geophones must be laid on the surface of the Earth. It is almost impossible to lay these cables in exactly the same location between each three-dimensional imaging session and further, even if the cables are placed relatively close to their locations from previous measurements, the geophones within the cable themselves may not be physically located the same as in previous three-dimensional images.

One way to combat these problems is to place the geophones vertically instead of horizontally. Rather than stretching cables across the surface of the Earth to place the geophones in a relatively horizontal position, the geophones themselves are semi-permanently lowered into well bores such that they are oriented vertically with respect to the surface of the Earth. The well bore into which the geophones may be lowered could be, for example, an existing oil or gas well or may be a well bore dedicated to sensor installation. While permanent placement of the geophones in a well bore may solved the placement problem for four-dimensional seismic imaging, new problems arise.

Given that seismic imaging fundamentally is measuring the arrival time of reflected waves at one location relative to arrival of reflected waves at another location, knowing the arrival time of all reflected waves relative to each other is critical to the computationally heavy burden of reconstructing an image of the below ground structures over time. To accomplish this task, large quantities of information must be recorded, substantially simultaneously, to correlate the arrival time of the various reflected waves. For traditional 3D seismic operations, whose sensors are simply laid on the surface of the Earth, having sufficient physical space necessary to communicate with each geophone is not a concern. For example, each geophone may have a single twisted pair cable, dedicated just to that geophone, coupled to a computer such that the computer can read each geophone substantially simultaneously. However, when permanently installing geophones in a vertical orientation in a well bore, physical space is not in abundance and therefore having a dedicated twisted pair cable for each geophone may not be feasible. Indeed, having a cable with a dedicated twisted pair for each geophone in a vertically oriented system, which may have as many as two hundred geophones, may require more cable cross-sectional area than the borehole itself.

Information is the key to being profitable in the oil and gas industry. The more information one has regarding location and migration patterns of hydrocarbons within a hydrocarbon reservoir, the more likely it is that that reservoir can be tapped at its optimal location and utilized to its full potential. To this end, new and moresophisticated sensor arrangements are routinely created and placed in the wireline sonde, so much so that the information carrying capacity of traditional wireline telemetry techniques are becoming inadequate. For these reasons it would be desirable to have a communication technique that can support high speed communications between downhole sensors and a surface installation.

BRIEF SUMMARY OF THE INVENTION

The problems noted above are solved in large part by a downhole telemetry system having discrete multi-tone modulation and dynamic bandwidth allocation. In one embodiment, the downhole telemetry system comprises a surface transceiver, a cable, and a downhole transceiver coupled to the surface transceiver via the cable. The downhole transceiver communicates to the surface transceiver using discrete multi-tone (DMT) modulation to transmit telemetry information over a set of frequency subchannels allocated for uplink communications. The surface transceiver may likewise communicate to the downhole transceiver using DMT modulation to transmit information over a set of frequency subchannels allocated for downlink communications. The number of uplink and downlink communications subchannels is preferably variable and preferably can be changed depending on the operating mode of the system. This allows additional subchannels to be allocated for downlink communications during programming and configuration of the downhole equipment, and additional subchannels to be allocated for uplink communications during normal logging operations. The set of uplink communications subchannels may be disjoint from the set of downlink communications subchannels, and the sets may be spaced apart in frequency or interleaved in frequency. The cable may be a single conductor or multi-conductor logging cable. In the case of the multi-conductor logging cable, one of several possible orthogonal transmission modes may be used to convey the information signals.

BRIEF DESCRIPTION OF THE DRAWINGS

For a detailed description of the preferred embodiments of the invention, reference will now be made to the accompanying drawings in which:

FIG. 7 shows a discrete multi-tone transmitter;

FIG. 8 shows a discrete multi-tone receiver; and

FIG. 9 shows a flowchart of a communications channel initialization method.

Figure 1:
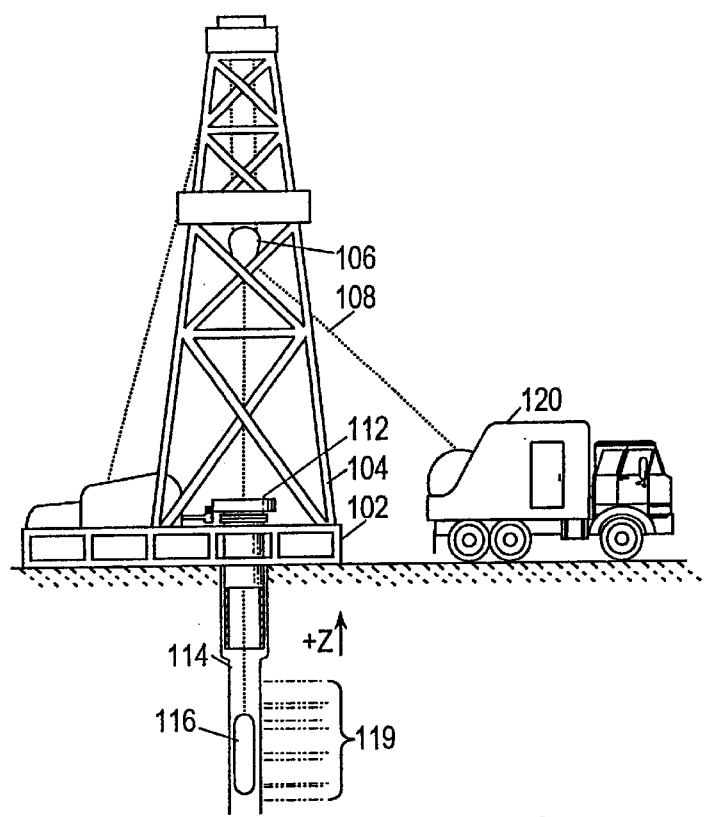
FIG. 1 shows wireline sonde being run through a well.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment.

DETAILED DESCRIPTION OF THE PREFERRED EMBODIMENTS

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together by "tool" joints so as to form a drilling string that is lowered through a rotary table 112 into a wellbore 114. In FIG. 1, it is assumed that the drilling string has been temporarily removed from the wellbore 114 to allow a sonde 116 to be lowered by wireline 108 into the wellbore 114. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. The sonde and the logging facility 120 preferably employ telemetry transmitters and receivers having discrete multi-tone (DMT) modulation and dynamic bandwidth allocation.

It is noted that the following telemetry system discussion will be presented in the context of a wireline system. However, it is recognized that this telemetry system may also be used for LWD and downhole seismic imaging, and the claims are not limited to wireline systems.

Figure 3:
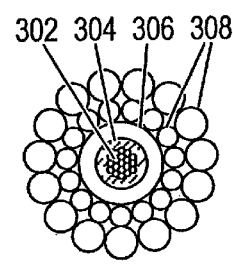
FIG. 3 shows a cross-section of a single-conductor logging cable.
Figures 2A, 2B, 4:
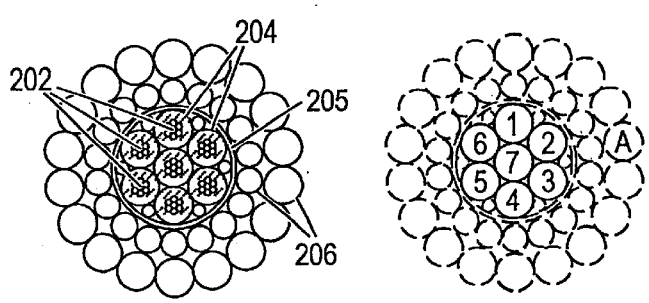
FIGS. 2A and 2B show a cross-section of a seven-conductor wireline cable.
FIG. 4 shows a cross-section of composite tubing with electrical conductors embedded in the wall.

FIG. 2A shows a cross-section of a typical wireline cable having multiple conductors 202. Each of the conductors is surrounded by an insulating jacket 204. The insulated conductors are bundled together in a semiconductive wrap 205, which is surrounded by two layers of counterwound metal armor wire 206. Being made of metal, the armor wires are conductive and may be used as an eighth conductor. For the sake of convenience, FIG. 2B shows a cross-section of the same wireline cable having its conductors numbered 1–7 and its armor labeled A. This notation will be used in describing the use of transmission modes below. In wireline logging of cased and cemented wells, a single conductor logging cable such as that shown in FIG. 3 may be preferred. The single conductor cable typically has a single, multi-stranded conductor 302 encased in insulative material 304 and wound within a fabric liner 306 which is in turn wound within a double layer of counter wound metal armor wires 308. FIG. 4. shows a cross-section of yet another alternative: composite tubing 402 with embedded conductors 404. The conductors 404 are preferably equally spaced around the circumference of the tubing, and wound helically along its length.

Power and telemetry are typically conveyed together on a single cable. In single conductor cables, the power is generally transmitted as a low frequency signal, whereas the telemetry signal(s) are transmitted in a higher frequency band. In multi-conductor cables, the signal isolation is further improved by the use of orthogonal transmission modes.

Figure 5:
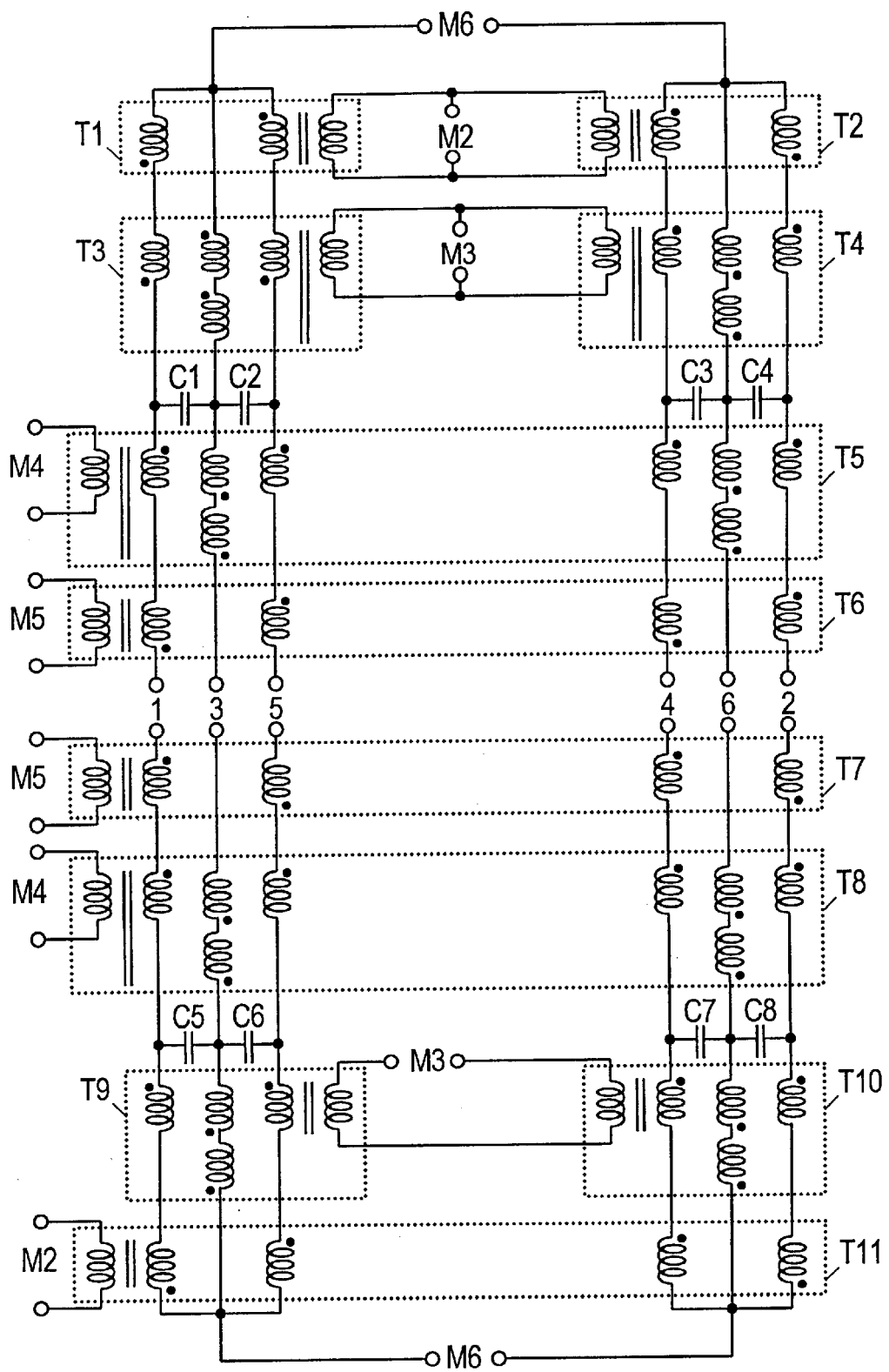
FIG. 5 shows orthogonal mode transmission and receiving circuitry.

FIG. 5 shows telemetry circuitry that makes use of orthogonal transmission modes. The surface equipment includes mode transformers T1 through T6, and capacitors C1 through C4. The mode transformers induce voltages on conductors 1–6 of the multiconductor cable in response to voltages supplied to their primary windings. The combination and polarity of the voltages imposed on the conductors forms a transmission mode that is designed to be orthogonal to each of the other transmission modes. Signals carried via the different transmission modes can be independently received by similarly configured mode transformers T7–T11 in the downhole equipment. In other words, the use of transmission modes eliminates signal cross-talk which would otherwise be caused by inductive and capacitive coupling between the conductors in the multi-conductor cable.

Power is supplied to terminals M6 for transport downhole via mode M6. To activate mode M6, conductors 1, 3, and 5 are placed at one polarity while the three remaining conductors 2, 4, and 6, must be placed at the opposite polarity. Since this is done by direct connection in FIG. 5 as opposed to transformer coupling, the mode M6 voltage may be either AC or DC. The power provided to mode M6 at the surface may preferably be as high as 1300 volts at 3 amps.

Power may also be supplied to terminals M2 for transport downhole. Mode M2 power is excited on conductors 1–6 by driving conductors 1 and 2 with one polarity while driving conductors 4 and 5 with the opposite polarity. Power transmitted via this modes may preferably be limited to less than 240 watts, with 120 watts delivered to the load at the opposite end of the cable.

Power supplied to terminals M3 is impressed by transformer T3 as a potential between conductor 3 and conductors 1 and 5, and by transformer T4 as an equal but opposite potential between conductor 6 and conductors 2 and 4. This excites mode M3 in the cable.

Transformers T1–T4 are power transformers which may have windings with a significant series inductance. This series inductance may effectively form an open circuit to signals transmitters at typical telemetry frequencies. To counteract this effect, the circuit of FIG. 5 has capacitors C1 through C4 to provide closed current paths at typical telemetry frequencies.

Mode transformer T5 operates to transmit and receive telemetry signals. Signals provided to terminals M4 are impressed as a potential between conductor 3 and conductors 1 and 5, and as an equal potential between conductor 6 and conductors 2 and 4. This excites mode M4 in the cable. The voltages at terminals M4 also reflect mode M4 signals received from downhole by mode transformer T8.

Mode transformer T6 similarly operates to transmit and receive telemetry signals. Signals provided to terminals M5 are impressed by driving conductors 1 and 4 with one polarity while driving conductors 2 and 5 with the opposite polarity. This excites mode M5 in the cable. The voltages at terminals M5 also reflect mode M5 signals transmitted from downhole by mode transformer T7.

In the downhole equipment, mode transformers T7 and T8, with the help of capacitors C5–C8, operate similarly to mode transformers T5 and T6 to send and receive telemetry signals via modes M5 and M4, respectively. Transformers T9 and T10 receive mode M3 power and provide it at terminals M3. Transformer T1 receives mode M2 power and provides it to the terminals marked M2. Mode M6 power is available at terminals M6. Orthogonal modes and the circuit of FIG. 5 are discussed in much greater detail in co-pending application Ser. No. 09/437,594, entitled "High-Power Well Logging Method And Apparatus" by inventors G. Baird, C. Dodge, T. Henderson and F. Velasquez, which is hereby incorporated herein by reference now U.S. Pat. No. 6,469,636.

Accordingly, there are at least two methods for establishing a communications channel for downhole communications. One of several orthogonal transmission modes may be used to carry the telemetry signal on a multiconductor cable, or a single conductor cable may be used to carry the telemetry signal in the normal fashion. In any case, it is desirable to maximize the rate at which information may be conveyed across the communications channel.

Information is typically conveyed by modulation of a carrier signal. One modulation technique which may be preferred for this application is discrete multi-tone (DMT) modulation. DMT modulation is used in Asymmetrical Digital Subscriber Line (ADSL) systems. ADSL systems commonly communicate via "twisted wire pair" cables. The available bandwidth for a long twisted pair cable extends in frequency to approximately 1.1 MHz. DMT modulation effective divides the available bandwidth of the system into sub-channels 4.3125 kHz wide, giving 256 possible sub-channels in the 1.1 MHz bandwidth. Traditional ADSL reserves the first sub-channel (from 0–4 kHz) for audio telephone signals, and typically provide a guard band separating the sub-channels for communication from the traditional telephone service band.

In the ideal case, each frequency sub-channel, or bin, would have the same data transmission rate as all the other frequency sub-channels. However, the data rate for each sub-channel varies for a myriad of reasons. For example, interference having a particular frequency may affect certain sub-channels whose frequency is at or near the frequency of the noise source. In this instance, those sub-channels with frequencies about the same as the noise source have lower signal to noise ratios and therefore their data carrying capacity is lower than other channels. In addition to interference from outside sources, the twisted pair cable itself may have an affect on the data carrying capacity of each sub-channel. Resistive and capacitive effects in the cable cause a frequency-dependent attenuation of the signals passing therethrough. The cable attenuation generally varies smoothly as a function of frequency with increasing attenuation at higher frequencies. Other system components, such as transformers or suboptimal impedance matching connectors, may further aggravate attenuation at selected frequencies. To compensate for line impairments of a twisted pair cable, the preferred embodiment measures the data transmission capability of each sub-channel and assigns a data transmission rate for that sub-channel to insure that each channel is used at its maximum reliable data transmission rate given its signal to noise ratio.

Figure 6A:
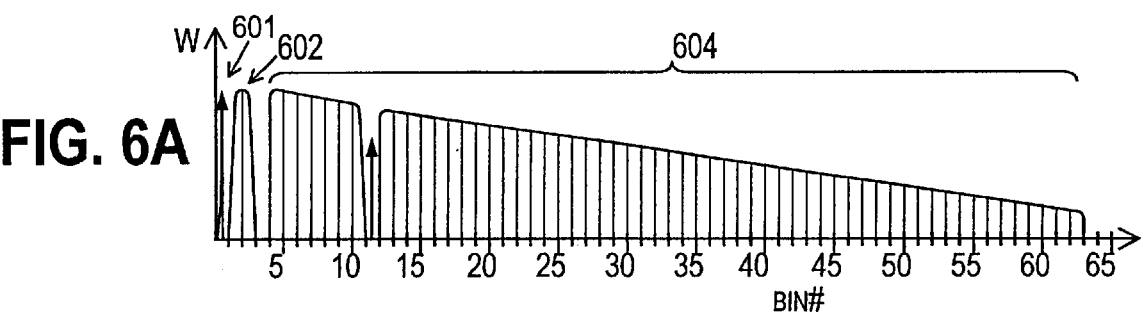
FIGS. 6A–6C show alternative bandwidth assignments.

For downhole communication systems, the sub-channels are preferably divided into an upstream band and a downstream band. FIG. 6A shows exemplary bandwidth allocations for a communications channel employing DMT modulation. The usable bandwidth between 0 and 1.1 MHz is preferably divided into 256 equally spaced subchannels each 4.3125 kHz wide. Some of the subchannels may be reserved for dedicated purposes. For example, assuming that the subchannels are numbered in order from low frequency to high frequency, subchannel #84 may be reserved for a pilot signal. Lower subchannel #1 (601) may be unused to provide a guard band for power signals. Some applications may call for 4 KHz power and allowance for harmonics may be desired.

In FIG. 6A, subchannels #2-#3 (602) are dedicated for downlink communications. Channel #4 may be used to provide a guard band between uplink and downlink communications. Channels #5-#11 and #13-#63 (604) are dedicated to uplink communications. Channel #12 may preferably be used to carry a pilot tone.

It is noted that the uplink and downlink information transfer rate requirements are generally not static as is assumed in most communication systems designs. During initialization and configuration of downhole instruments, it is desirable to provide a downlink information transfer capacity that is substantially larger than the uplink information transfer capacity. The downlink is used to transfer software, commands, and parameters, and the role of the uplink is generally limited to acknowledging receipt of information packets. During normal operation, the downlink is generally limited to acknowledgements, while the uplink carries measurement data and status information.

Figure 6B:
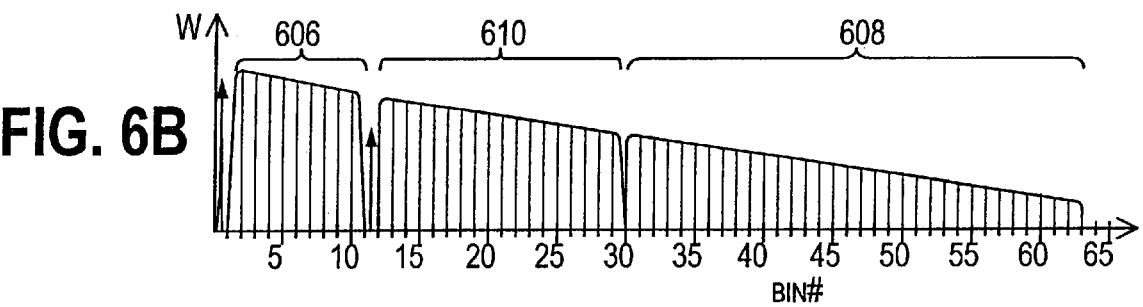

FIG. 6B shows a different bandwidth allocation method, in which a set of subchannels 606 is dedicated to downlink communications, a different set 608 is dedicated to uplink communications, and a third set 610 is dynamically assigned to uplink or downlink communications as needed. In one contemplated embodiment, channels #2-#11 are reserved for downlink communications, channels #31-#63 are reserved for uplink communications, and channels #13-#30 are dynamically assigned. Although set 610 may be assigned as a whole, it is preferred that a division of the set be made so that the lower frequency portion is allocated to downlink and the upper frequency portion is allocated to uplink. Preferably, one or two subchannels are allocated as a guardband between the upper and lower frequency portions. These guardband subchannels are not allocated to either the uplink or downlink.

In another contemplated, reduced bandwidth embodiment, subchannel #2 is reserved for downlink, subchannels #13-#37 are reserved for uplink, and channels #3-#12 are allocated as needed, allowing for at least a two-subchannel guardband between the uplink and downlink communications. Subchannels above #37 may go unused due to bandwidth limitations.

Figure 6C:
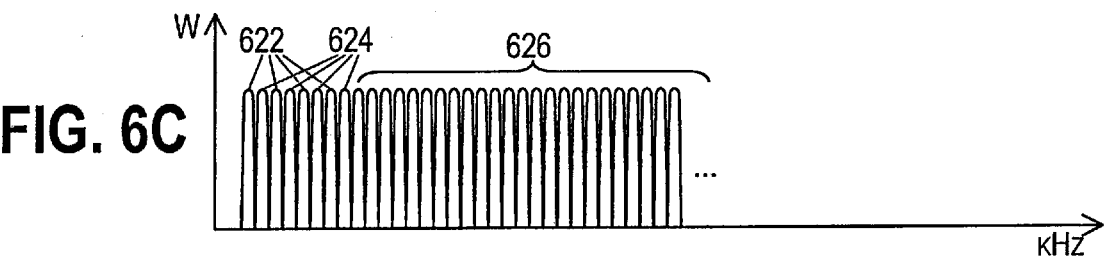

FIG. 6C shows another contemplated embodiment, in which the reserved downlink subchannels 622 are interleaved with the reserved uplink subchannels 624. Since the attenuation of the channel is expected to increase smoothly for higher frequencies, subchannels at the lower channel frequencies are expected to provide higher information transfer rates than the subchannels at the higher frequencies. The use of interleaving allows the uplink and downlink to each have their share of the more desirable subchannels. The set of subchannels 626 can be dynamically allocated to either the uplink or downlink channels as needed, but the interleaving is preferably extended to the extent that additional subchannels are allocated to both the uplink and downlink.

FIG. 7 shows a block diagram of a DMT transmitter 702. It includes a data framer 704, a scrambler 706, an encoder 708, an interleaver 710, a tone mapper 712, an inverse discrete Fourier transform (IDFT) block 714, a cyclic prefix generator 716, and a line interface 718. The data framer 704 groups bytes of uplink data together to form data frames.

The data frames are then grouped together with a synchronization frame and a cyclic redundancy checksum (CRC) which is calculated from the contents of the data frames. The CRC provides one means for detecting errors in data received at the receiving end. The scrambler 706 combines the output of the data framer 704 with a pseudo-random mask. This "randomizes" the data so as to flatten the frequency spectrum of the data signal. The scrambled data is encoded by encoder 708 with an error correction code that adds redundancy to the data stream. The redundancy may be used to detect and correct errors caused by channel interference. A Reed-Solomon (RS) code is preferred, but other error correction codes may also be used. Interleaver 710 is preferably a convolutional interleaver which reorders data stream symbols so as to "spread out" previously adjacent symbols. This prevents an error burst from overcoming the localized error correction ability of the error correction code.

Tone mapper 712 takes bits from the data stream and assigns them to frequency bins. For each frequency bin, the bits are used to determine a discrete Fourier transform (DFT) coefficient that specifies a frequency amplitude. The number of bits assigned to each frequency bin is variable (i.e. may be different for each bin) and dynamic (i.e. may change over time), and depends on the estimated error rate for each frequency. Microcontrollers (not shown) at each end cooperate to determine the error rate detected by the receiver in each frequency band, and to adjust the tone mapper accordingly.

The coefficients provided by the tone mapper 712 are processed by IDFT block 714 to generate a time-domain signal carrying the desired information at each frequency. The cyclic prefix block duplicates the end portion of the time-domain signal and prepends it to the beginning of the time domain signal. As discussed further below, this permits frequency domain equalization of the signal at the receiving end. The prefixed signal is then converted into analog form, filtered, and amplified for transmission across the communications channel by line interface 718.

A block diagram of a DMT receiver 802 is shown in FIG. 8. It includes a line interface 804, a cyclic prefix stripper 806, a DFT block 808, a frequency domain equalizer 810, a constellation decoder 812, a de-interleaver 814, an error correction decoder 816, a descrambler 818, and a deframer 820. Line interface 804 filters the received signal, converts it to digital form, and performs any desired time domain equalization. The time domain equalization at least partially compensates for distortion introduced by the channel, but it is likely that at least some intersymbol interference will remain. Stripper block 806 removes the cyclic prefixes that were added by the prefix block 716, but importantly, trailing intersymbol interference from the cyclic prefix remains in the signal. DFT block 808 performs a DFT on the signal to obtain the frequency coefficients. If desired, frequency domain equalization may be performed by block 810 to compensate for any remaining intersymbol interference. It is noted that frequency domain equalization on DFT coefficients is a cyclic convolution operation which would lead to incorrect equalization results had the cyclic prefix not been transmitted across the channel.

The constellation decoder 812 extracts the data bits from the frequency coefficients using an inverse mapping of the tone mapper 712. De-interleaver 814 then returns the data stream to its original order. Decoder 816 decodes the data stream correcting such errors as are within its correcting ability, and descrambler 818 combines the data with the pseudo-random mask to return the data to its unscrambled form. De-framer 820 then identifies and removes synchronization information, and determines if the CRC indicates the presence of any errors. If error free, the data is forwarded to the output. Otherwise, the microcontroller is notified of errors in the data.

Together, FIGS. 7 and 8 show how uplink telemetry can be conveyed across a communications channel. Downlink communications can be similarly conveyed. The components may be implemented as discrete hardware, or preferably may be implemented as software of a digital processor within the modem.

FIG. 9 shows one method of configuring the communications channel. The surface transceiver executes a configuration routine 902 that begins with an activation block 904. In this block, the modems are both powered on, and a handshake phase is performed. The modems each transmit single tones to identify themselves and determine which one will control the timing of the channel. The activation block is followed by a training block 906 in which each modem takes turns transmitting wideband signals. The wideband signals allow each unit to calculate the received power spectral density, to adjust automatic gain controls, and to perform initial training of the equalizers in each receiver. The training block is followed by an analysis block 908. In the analysis block, the two modems communicate capabilities and configuration information to each other. This information preferably includes desired information transmission rates. In the exchange block 910, the modems negotiate a mutually acceptable configuration. In a downhole telemetry system, the surface modem is programmed to assert priority in determining what an acceptable configuration is. The surface modem is also programmed to determine the desired information transmission rate based on the operating mode of the system. In the initialization phase of the system, the surface modem is programmed to configure the channel with a greater than normal number of downlink subchannels and a reduced number of uplink subchannels. In the normal operating phase of the system, the surface modem is programmed to configure the channel with a normal number of downlink subchannels, and the maximum number of uplink subchannels.

The above discussion is meant to be illustrative of the principles and various embodiments of the present invention. For example, the present invention has been discussed in the context of wireline logging. However, it may also prove advantageous in the context of LWD, particularly in when composite tubing is used. One particular transmission medium may be a long hollow nonconducting pipe with 6 equally spaced electrical conductors embedded within the wall of the flexible pipe. Numerous other variations and modifications will become apparent to those skilled in the art once the above disclosure is fully appreciated. It is intended that the following claims be interpreted to embrace all such variations and modifications.

What is claimed is:

1. A downhole telemetry system that comprises:
   a surface transceiver;
   a cable; and
   a downhole transceiver coupled to the surface transceiver via a cable, wherein the downhole transceiver communicates to the surface transceiver using discrete multi-tone modulation to transmit telemetry information over a set of frequency subchannels allocated for uplink communications,
   wherein the surface transceiver communicates to the downhole transceiver using discrete multi-tone modulation to transmit information over a set of frequency subchannels allocated for downlink communications, and wherein the number of downlink communications subchannels is dynamically determined by the surface transceiver.

2. A downhole telemetry system that comprises:

a surface transceiver;

a cable; and a downhole transceiver coupled to the surface transceiver via a cable, wherein the downhole transceiver communicates to the surface transceiver using discrete multi-tone modulation to transmit telemetry information over a set of frequency subchannels allocated for uplink communications, wherein the surface transceiver communicates to the downhole transceiver using discrete multi-tone modulation to transmit information over a set of frequency subchannels allocated for downlink communications, and wherein the number of downlink communications subchannels is variable and is determined according to an operating mode of the system.

3. The system of claim 2, wherein the number of downlink communications subchannels is increased while the system is operating in a configuration mode relative to the number of downlink communications subchannels when the system is operating in a logging mode.

4. The system of claim 2, wherein the number of uplink communications subchannels is decreased while the system is operating in a configuration mode relative to the number of uplink communications subchannels when the system is operating in a logging mode.

5. The system of claim 2, wherein the downlink communications subchannels are disjoint from the uplink communications subchannels.

6. The system of claim 5, wherein the uplink communications subchannels are interleaved in frequency with the downlink communications subchannels.

7. The system of claim 5, wherein the uplink communications subchannels are adjacent to each other and the downlink communications subchannels are adjacent to each other.

8. The system of claim 7, wherein the uplink communications subchannels are separated from the downlink communications subchannels by a guard band.

9. The system of claim 2, wherein the cable is a multi-conductor cable, and wherein the uplink and downlink communications are transported along the cable by a transmission mode.

10. The system of claim 9, wherein the transmission mode is mode M3.

11. A method of communicating with a downhole package, wherein the method includes:

allocating a set of subchannels for downlink communications;

allocating a set of subchannels for uplink communications;

transmitting to a modem in the downhole package configuration information that includes an indication of the set of uplink communications subchannels and the set of downlink communications subchannels;

transmitting information to the modem via the downlink communications subchannels using discrete multi-tone modulation;

receiving information from the modem via the uplink communications subchannels using discrete multi-tone modulation;

subsequently changing the allocation of subchannels to reduce the number of subchannels allocated for downlink communications and to increase the number of subchannels allocated for uplink communications; and transmitting to the modem configuration information that includes an indication of the new allocation of subchannels.

12. The method of claim 11, wherein the number of subchannels allocated to downlink communications is determined according to a system operating mode, and wherein the number of subchannels is changed when the system operating mode is changed.

13. The method of claim 11, wherein the set of uplink communications subchannels is disjoint from the set of downlink communications subchannels.

14. The method of claim 13, wherein the uplink communications subchannels are frequency-interleaved with the downlink communications subchannels.

15. The method of claim 13, wherein the uplink communications subchannels are adjacent to each other and the downlink communications subchannels are adjacent to each other.

16. The method of claim 6, wherein the set of uplink communications subchannels are separated from the set of downlink communications subchannels by a guard band.

17. The method of claim 11, wherein the set of downlink communications subchannels includes a fixed set of downlink communications subchannels reserved for downlink communications, and the set of uplink communications subchannels includes a fixed set of uplink communications subchannels reserved for uplink communications.

* * * * *